G. E. ROOSE.
MACHINE FOR CUTTING BRUSH.
APPLICATION FILED SEPT. 4, 1908.
957,101.
Patented May 3, 1910.
3 SHEETS—SHEET 1.
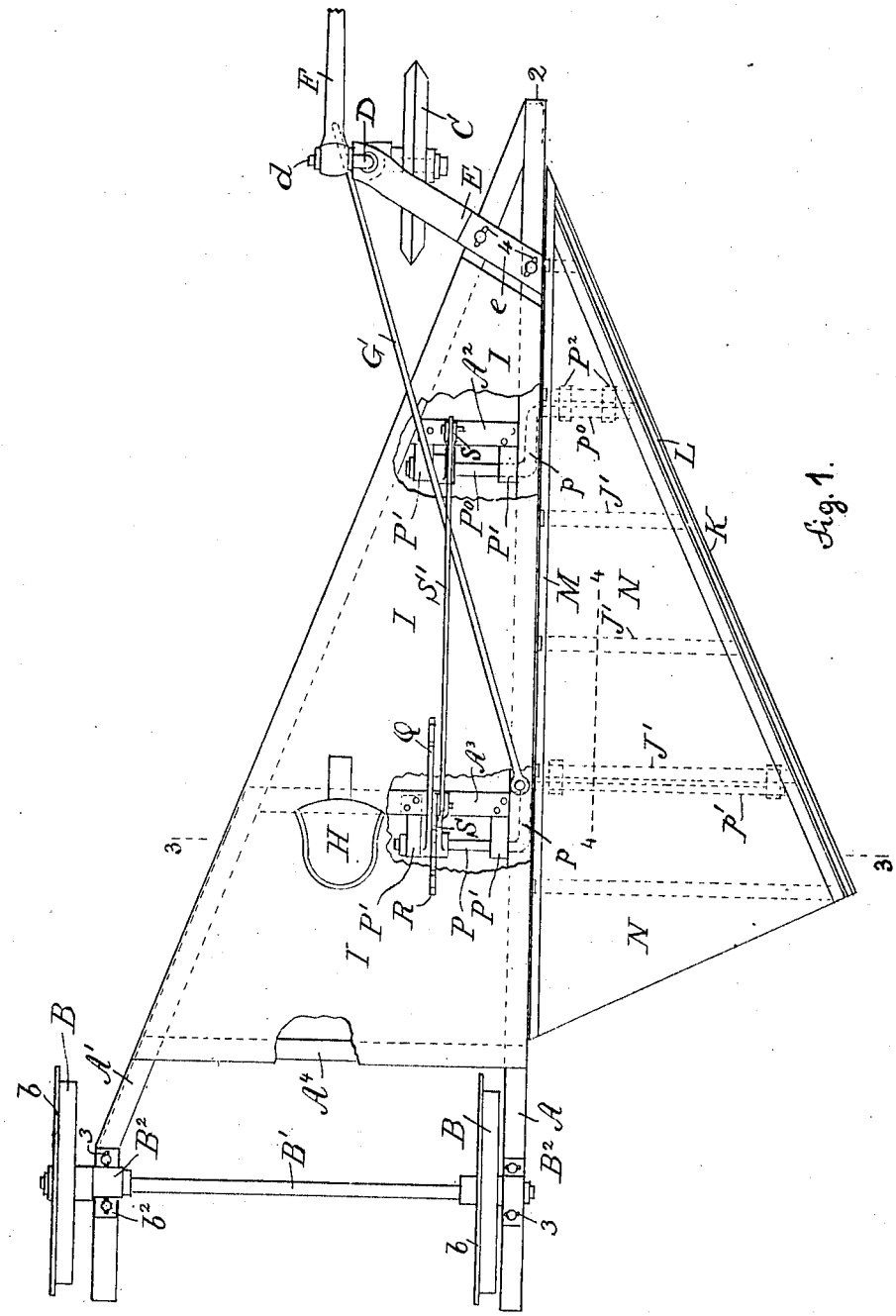
Witnesses:
Agnes Harvey
E. Harvey
Gustave E. Roose
Inventor
by A & B. Harvey
his Attorneys

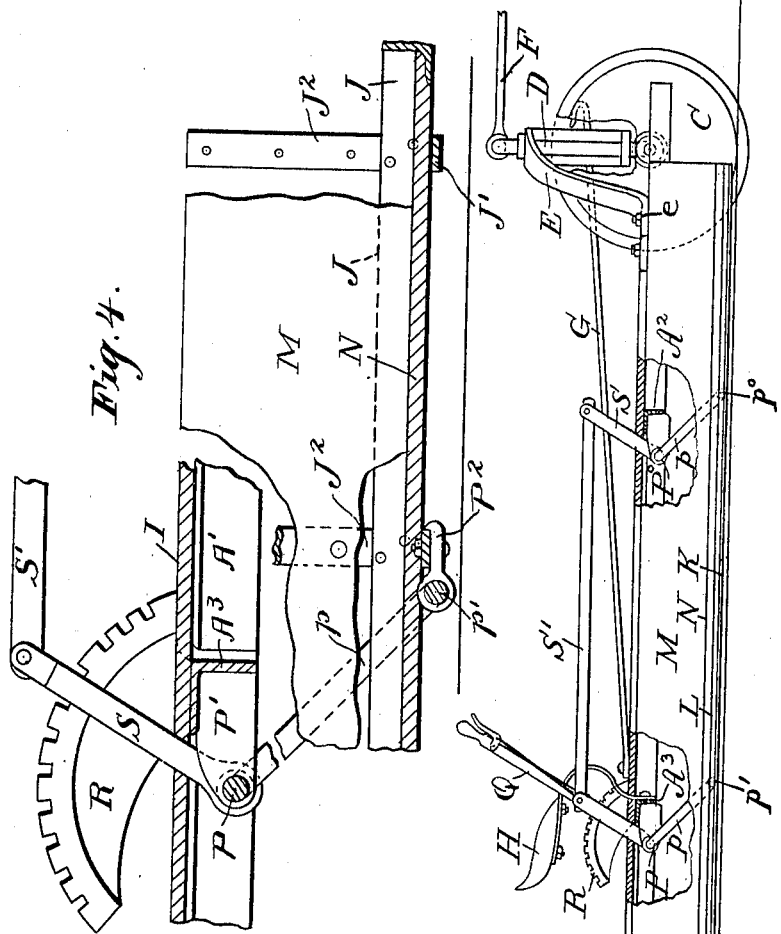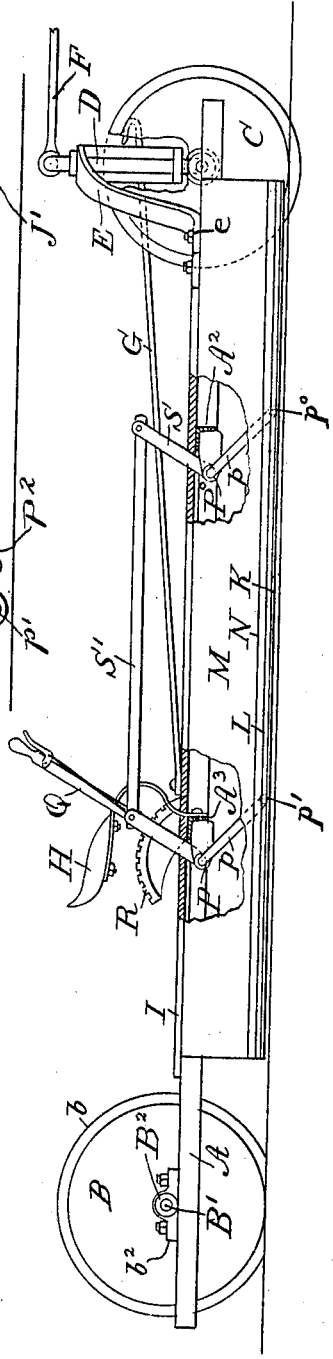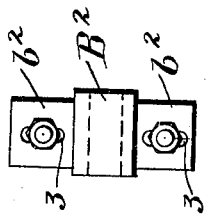

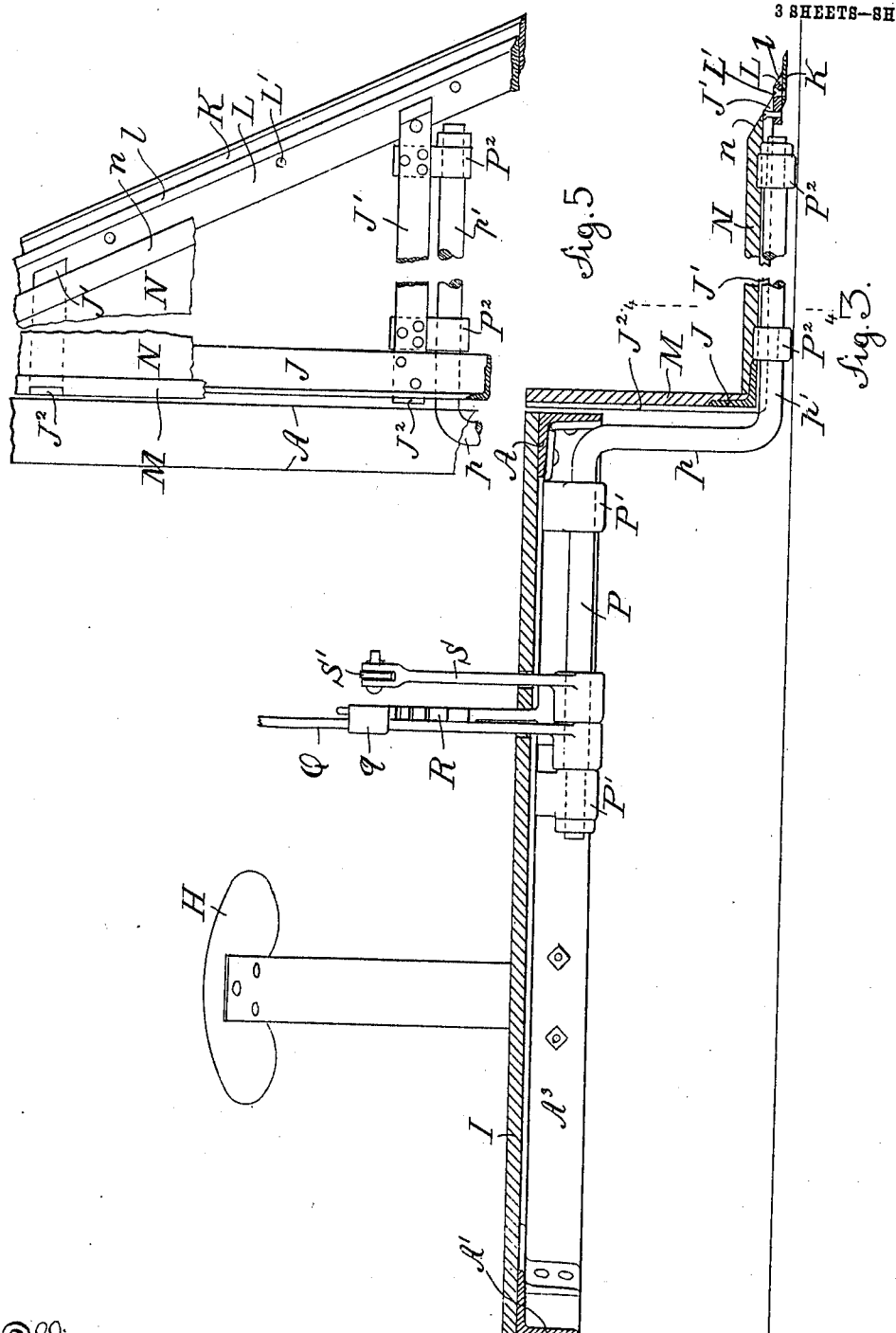

UNITED STATES PATENT OFFICE.

GUSTAVE E. ROOSE, OF WETASKIWIN, ALBERTA, CANADA, ASSIGNOR OF ONE-HALF TO WILLIAM JAMES McNAMARA, OF WETASKIWIN, CANADA.

MACHINE FOR CUTTING BRUSH.

957,101. Specification of Letters Patent. Patented May 3, 1910.

Application filed September 4, 1908. Serial No. 451,753.

*To all whom it may concern:*

Be it known that I, GUSTAVE E. ROOSE, residing at Wetaskiwin, in the district of Wetaskiwin, Province of Alberta, and Dominion of Canada, have invented new and useful Improvements in Machines for Cutting Brush, of which the following is a specification.

My invention which will be hereinafter fully set forth and claimed relates to implements for cutting down brush and shrub for parts of which I have obtained a patent in Canada, No. 110,894, dated March 24th 1908.

The object of my invention is a machine that will cut brush and other strong growths on virgin or neglected lands.

Figure 1 is a plan of my improved brush cutting machine, parts being broken out to show the construction. Fig. 2 is a side elevation of the same. Fig. 3 is a transverse section of the same, on line 3—3, Fig. 1 on a larger scale. Fig. 4 is a longitudinal section of part of the cutting table, on line 4—4, Figs. 1 and 3, on the same scale as Fig. 3. Fig. 5 is a plan or top view of part of the cutting table on the same scale as Figs. 3 and 4, showing the frame work, and Fig. 6 is a detail.

A triangular frame work is formed of two longitudinally disposed beams, A A¹, joined at the forward end, 2, into a blunt apex and braced by cross bars, A² A³ and A⁴. This frame is supported at the rear upon a pair of wheels B, having deep flanges, $b$, adapted to cut into the ground and thus resist the side thrust exerted by the oblique knife. These are mounted upon an axle, B¹, journaled in bearings, B², which are secured adjustably upon the beams A A¹. The feet, $b^2$, of the brackets in which the bearings are formed have the boltholes, 3, slotted, as shown in Figs. 1 and 6, one bracket transversely and the other longitudinally, enabling the axle B¹ to be set at different angles to the main frame, it being normally at a right angle to the inner beam A.

The front or nose is supported by a single wheel, C, which is also formed with a sharp tread capable of cutting into the ground and thus resisting lateral thrust. This wheel is journaled upon the lower cranked end of a vertical spindle D, turning in a bracket, E, upon the upper cranked end, $d$, of which spindle is journaled the end of the tongue, F. The bracket E has a flat foot, $e$ bedded upon the beams A and A¹, the bolts holding it passing through slotted bolt holes 4, in the foot, enabling a moderate adjustment.

G is the draft-rod; it is secured to the beam A toward the rear and passes under the tongue F where it is held free in a link secured to the bracket E. A driver's seat, H, is provided and suitably secured upon the frame. A top board, I, acts as a floor upon the framework, forming a complete platform and thus completes what may be termed the vehicle part of the implement for carrying the operating mechanism.

A cutting table is placed at one side of the vehicle above described and carried by the same in a manner to be more fully set forth. It is triangular in plan, its apex being near the front or apex of the vehicle, one side carried close to the beam A and the side of the vehicle and the other holding the knife-bar presenting an oblique line to the direction of the progress of the vehicle. A mode of construction—which may vary considerably—is shown for the sake of illustration in Figs. 3, 4 and 5.

To an angle-bar, J, are secured a number of transverse bars or ribs, J¹, varying in length according to the distance of their position from the apex. To the outer ends of these ribs is secured the knife-bar, L, and to this the thin knife-blade K. Uprights, J², which may be in one piece with the ribs J¹, are secured to the vertical web of the angle-bar J to form a support for a backboard, M, and a floor board, N, is carried by the ribs J¹ extending from the back-board to the knife-bar and forming a platform with a plain uninterrupted surface but little higher than the cutting edge of the blade K, which has, naturally, the lowest position. The edges of the knife bar and top-board are chamfered, as at $l$ and $n$, Figs. 3 and 5, affording a gradual rise from the cutting edge to the top N. Screws, L¹, countersunk, are shown in Figs. 3 and 5, by which the blade K is secured to the bar L, as it is desirable to hold the blade removably for sharpening and the like. The open spaces formed by the ribs J¹ between the knife bar L and the top N may be filled or made up in any desired manner, as for instance by a strip secured to the bottom of the top and forming part of its chamfered edge, $n$. The blade K may have both edges sharpened, so that it can be reversed and a fresh cutting edge obtained when one has become blunted and convenience for sharpening is lacking.

For connecting the cutting table adjustably to the vehicle, various devices may be employed. In the example illustrated this is effected by means of a pair of crank-shafts, P and P⁰, journaled to both the vehicle and the cutting table and provided with controlling and connecting devices. The crank shaft P, placed convenient to the driver's seat, is journaled in brackets, P¹, secured to the cross bar A², and its crank arm, $p$, is turned at a right angle, parallel to, but in the opposite direction of the shaft, as a long crank pin, $p^1$. This latter extends under the cutting table and is journaled to the same in brackets, P² P², secured to one of the ribs J¹ which is arranged to be adjacent to it. This crank pin $p^1$ passes close to the bottom of the angle-bar J, so as to just clear the same without cutting into it and thus impairing its strength and without the lowest part of the pin going appreciably below the level of the cutting edge of the knife blade K and causing an obstruction on the stubs of the brush. Said crank shaft P is controlled by a lever, Q, made fast upon it and placed convenient to the driver's seat. It is provided with the usual catch block, $q$, engaging the notches of a sector, R, so as to be secured in any desired position. The other crank shaft P⁰ is in all respects similar to the one described, being journaled in brackets P¹ secured to the cross bar A² and having a crank arm $p$, but its crank pin $p^0$ being shorter, on account of the decreased width of the cutting table where it is journaled in a similar manner in brackets P² P² placed nearer together but also secured to an adjacent rib J¹. The two crank shafts P and P⁰ are connected by a pitman, S¹, engaged by the forked ends of a pair of levers, S, of which each shaft carries one. Thus by means of the lever Q both the crank-shafts P and P⁰ may be turned and the cutting table may be raised or lowered to cut a longer or shorter stub or raised high up when traveling from place to place.

It will be observed that the vehicle carrying the mechanism is long, narrow and low, its width having relation to the counterweight of the cutting table while its length with the wheels at the rear cutting into the ground, affords greater leverage against the side pressure exerted by the cutting table. Its triangular shape enables it to sheer into brush with reduced resistance.

I claim as my invention.

1. In a machine for cutting brush, the combination with a triangular frame, of an axle carried adjustably at the rear normally at a right angle with one side, wheels upon said axle having cutting flanges, a guide wheel at the apex, a vertical spindle having a lower crank end upon which said guide wheel is journaled and an upper crank end to which the tongue is pivoted, a bracket secured adjustably near the apex of the frame in which said spindle is journaled, a draft-rod secured to said frame and held loosely by said bracket, a top upon said frame forming a platform, a driver's seat secured to said frame, a triangular cutting table carried vertically adjustable on one side of the frame and having its cutting edge sloping from the apex rearward and outwardly, a cutting blade at the edge of said table and means of raising and lowering said table, substantially as set forth.

2. In a machine for cutting brush, the combination with a long low and narrow vehicle having wheels with cutting flanges at its extremities, of a triangular cutting table having one side close to one of the sides of the vehicle, a knife bar forming the outer obliquely projecting edge of said table, a knife-blade secured to said bar, a top on said table, a back board on the edge of said table adjacent to the vehicle, and means for raising and lowering said table, substantially as set forth.

3. In a machine for cutting brush, the combination with a long low and narrow vehicle substantially triangular in plan having wheels with cutting flanges at its extremities, means of guiding and propelling the same, crank shafts journaled transversely to said vehicle and having long crank pins projecting at one side, means of rocking one of said shafts, means of connecting said shafts and causing them to act in unison, a triangular cutting table to the bottom of which said crank pins are journaled, a knife-bar at the outer edge of said table and a knife blade secured to said bar, substantially as set forth.

4. In a machine for cutting brush, the combination with a long low and narrow vehicle substantially triangular in plan having wheels with cutting flanges at its extremities, means of guiding and propelling the same, crank shafts journaled transversely to said vehicle and having crank pins projecting at one side, a hand lever secured upon one of said shafts, a rocking lever secured upon each of said shafts, a pitman connecting said rocking levers, a triangular cutting table carried upon the crank pins aforesaid and which are journaled thereto, a knife-bar secured to the obliquely projecting edge of said table and a double edged knife blade secured to said knife bar, substantially as set forth.

5. In a machine for cutting brush, the combination of a long low and narrow vehicle substantially triangular in plan having wheels with cutting flanges at its extremities, an axle carrying the rear wheels, bearings in which said axle is journaled having slotted holes in their feet to allow adjustment of their position on the frame, means of guiding and propelling said vehicle, a triangular cutting table carried at one side of said vehicle, a knife bar forming the outer obliquely projecting edge of said table, a knife blade secured to said bar and means of raising and lowering said table, substantially as set forth.

6. In a machine for cutting brush, the combination of a low vehicle substantially triangular in plan, an axle at the rear end carrying a pair of wheels with cutting flanges, a bracket secured adjustably at the apex of the vehicle and projecting obliquely forward on the obliquely projecting side of the vehicle, a spindle journaled upright in said bracket and having two cranked ends, a guide wheel with cutting rim journaled upon the lower crank of said spindle and the vehicle tongue journaled upon the upper crank of said spindle, a triangular cutting table carried at the straight side of said vehicle and means for raising and lowering said table, substantially as set forth.

In testimony whereof I affix my signature, in presence of two subscribing witnesses.

G. E. ROOSE.

Witnesses:
 ROSLYN S. SMITH,
 R. W. GIBBS.